United States Patent [19]

Eros

[11] Patent Number: 4,659,556

[45] Date of Patent: Apr. 21, 1987

[54] SINGLE STEP PURIFICATION OF SULFUR DIOXIDE GAS PREPARED BY THE COMBUSTION OF SULFUR CONTAINING COMPOUNDS

[75] Inventor: Donald A. Eros, Wilmington, Del.

[73] Assignee: General Chemical Corporation, Morristown, N.J.

[21] Appl. No.: 472,304

[22] Filed: Mar. 4, 1983

[51] Int. Cl.[4] .................. C01B 17/98; C01B 17/48; C01B 17/74

[52] U.S. Cl. .................. 423/522; 423/533; 423/539; 55/73; 55/83; 55/93

[58] Field of Search .......... 423/539, 522, 533; 422/160, 161; 55/83, 93

[56] References Cited

U.S. PATENT DOCUMENTS

| | | | |
|---|---|---|---|
| 940,595 | 11/1909 | Herreshoff | 423/522 |
| 1,811,797 | 1/1931 | Lechler | 423/522 |
| 2,019,893 | 11/1935 | Clark | 423/522 |
| 2,028,733 | 1/1936 | Clark | 423/522 |
| 2,038,429 | 4/1936 | Hechenbleikner | 423/522 |
| 2,174,739 | 10/1939 | Gilchrist et al. | 423/522 |
| 2,901,061 | 8/1959 | Hartig | 55/73 |
| 3,475,120 | 10/1969 | Maurer et al. | 423/522 |
| 3,593,497 | 7/1970 | Grimm | 423/522 |
| 3,788,043 | 1/1974 | Dorr et al. | 423/522 |
| 3,853,502 | 12/1974 | Dorr et al. | 423/522 |
| 3,948,624 | 4/1976 | Fornoff et al. | 423/522 |
| 3,950,493 | 4/1976 | Dorr et al. | 423/522 |
| 4,136,153 | 1/1979 | Robertson et al. | 55/73 |

OTHER PUBLICATIONS

Duros et al., Acid Mist Control, Cep, Sep. 78, pp. 70–77.

*Primary Examiner*—Gary P. Straub
*Attorney, Agent, or Firm*—Arthur J. Plantamura

[57] ABSTRACT

A process for purifying sulfuric dioxide gas prepared by the combustion of sulfur containing compounds by scrubbing the gas with a sulfuric and composition having a sulfuric acid content of at least about 85 percent by weight based on the total weight of the composition.

9 Claims, 1 Drawing Figure

SINGLE STEP PURIFICATION OF SULFUR DIOXIDE GAS PREPARED BY THE COMBUSTION OF SULFUR CONTAINING COMPOUNDS

BACKGROUND OF THE INVENTION

1. Field of the Invention

This invention relates to a method of purification of sulfur dioxide containing process gas streams resulting from the combustion of sulfur containing compounds. More particularly, this invention relates to such a method wherein purification is carried out in a single step.

2. The Prior Art

Numerous procedures have been developed for the production of sulfuric acid, all of which involve catalytic oxidation of sulfur dioxide to sulfur trioxide in the presence of some catalyst and absorption of the sulfur trioxide into concentrated sulfuric acid to form further sulfuric acid. Sulfur dioxide employed in the catalytic oxidation is usually formed by the combustion of a sulfur containing feed stream. The sulfur containing feed stream can be waste sulfuric acid, elemental sulfur, hydrogen sulfide, pyrites or other sulfides, or sludge acid derived from petroleum refining or any other compatible sulfur containing materials. In addition to sulfur dioxide, water vapor and oxygen, the combustion process stream includes carbon dioxide and minor quantities of solid materials. Prior to using the process gas stream in the catalytic oxidation reaction, the stream must be cooled and both the solid materials and the water must be removed.

Several methods have been proposed for cooling the hot combustion process gases, and for removing water and solid contaminants. Most of these processes employ multistep procedures. For example, processes in which the sulfur dioxide containing process gas stream in a sulfuric acid process is scrubbed with concentrated sulfuric acid to remove water vapor prior to catalytic oxidation of the sulfur dioxide to sulfur trioxide are described in U.S. Pat. Nos. 940,595; 2,019,893; 2,028,733; 2,038,429 and 2,174,739. Another prior art patent, U.S. Pat. No. 3,475,120, describes a procedure in which the gas is first cooled by passing through a heat exchanger and is then scrubbed with water to remove entrained solid particles and also for gas cooling purposes. The cooled/scrubbed gas which now contains sulfuric acid aerosol mist is passed through some type of electrostatic precipitator, or other type of mist eliminator to remove the acidic aerosol mist. The process gas stream which is now free of entrained liquid droplets does include water vapor which must be removed prior to catalytic oxidation of the sulfur dioxide component to sulfur trioxide. To remove the water vapor, the process gas stream is scrubbed with concentrated sulfuric acid having a strength in the range of from 78% to 100% sulfuric acid content by weight. The concentrated sulfuric acid acts as a dehydrating agent and readily absorbs all of the water vapor from the process gas stream.

These multistep prior art purification procedures suffer from a number of inherent disadvantages. For example, these procedures are time consumming, require large capital expenditures and have large manpower and maintenance requirements.

SUMMARY OF THE INVENTION

In accordance with the process of this invention there is provided an improved single step process for removing solid materials and water from a process gas stream comprising sulfur dioxide, water and entrained solid materials produced from the combustion of one or more sulfur containing materials, which process comprises:

scrubbing said process gas stream with a sulfuric acid composition comprising at least about 85 weight percent sulfuric acid based on the total weight of the composition; and removing sulfuric acid mist and any remaining solid materials from said gas.

BRIEF DESCRIPTION OF THE DRAWING

The present invention is further illustrated by the annexed drawing wherein.

DESCRIPTION OF THE PREFERRED EMBODIMENTS

Figure 1:
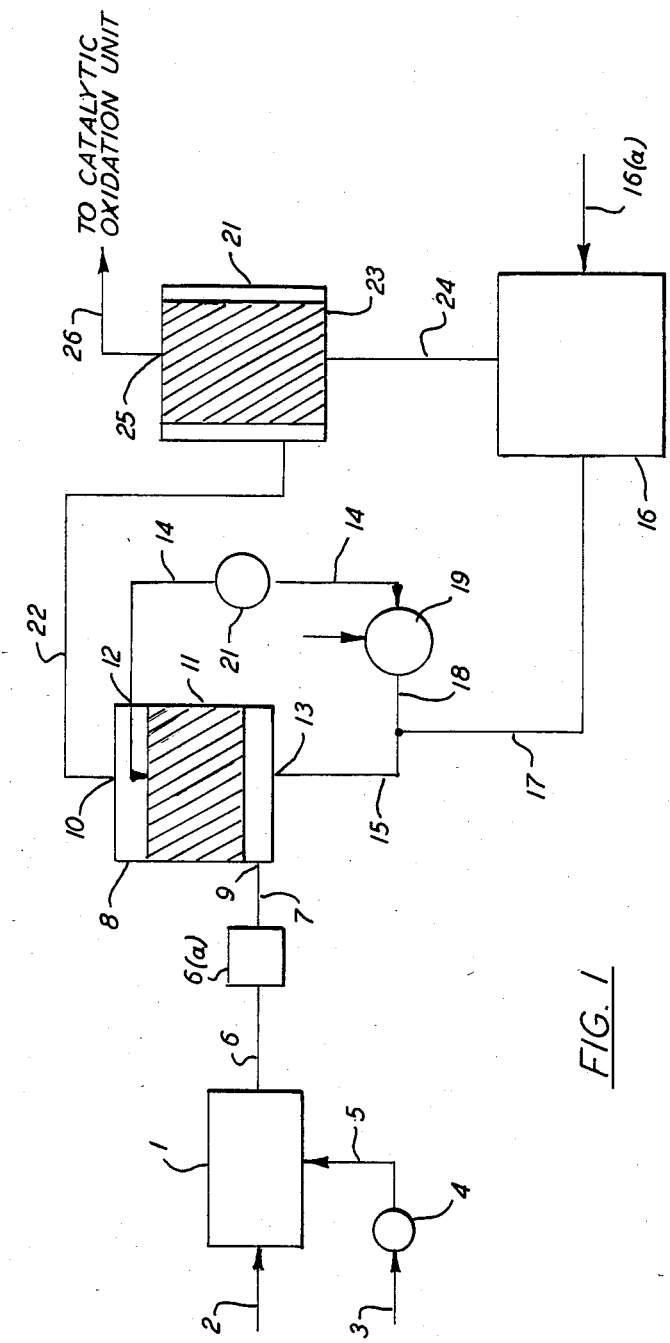
FIG. 1 is a schematic diagram of a preferred embodiment of this invention.

Referring now to FIG. 1, a sulfur-containing feed stream 1 is passed into combustion furnace 2. Stream 1 may consist of any suitable sulfur-containing material, such as but not limited to sludge acid, pyrites, other types of sulfide ores, waste sulfuric acid, or hydrogen sulfide. Additional fuel may be required to meet temperature requirements. Combustion and oxidation air stream 3 is passed via blower 4 and stream 5 into furnace 2 at a relatively elevated pressure, in order to provide the requisite pressure driving force for circulating the main process gas stream through the apparatus units of the process sequence. System may be operated under minus conditions with blower located in stream 26. A combustion reaction takes place at elevated temperatures between streams 1 and 5 in furnace 2, resulting in the generation of a high temperature process gas stream 6 containing sulfur dioxide and excess free oxygen, as well as nitrogen and water vapor. Stream 6 will usually also contain entrained solid particles, derived from stream 1, and stream 6 will also contain carbon dioxide in instances when stream 1 contains carbonaceous material, such as sludge acid derived from petroleum refining, and waste sulfuric acid. In most instances when sludge acid from petroleum refining is utilized as stream 1, the blended sludge acid feed will contain from 70% to 95% sulfuric acid, 3% to 21% water and 2% to 20% hydrocarbons. In cases where pyrites is employed as the sulfur-containing feed stream 1, unit 2 will consist of a conventional type of pyrites burner such as a tray or fluid bed unit, and will be provided with ancillary means for removal of solid pyrites cinder.

Stream 6 is produced at a highly elevated temperature which is dependent upon the particular composition of stream 1, since optimum temperature conditions in unit 2 will depend upon the nature and combustion characteristics of stream 1. In most instances, stream 6 will be produced at a temperature of from about 200° C. to about 1200° C. In the preferred embodiments of the invention in which waste sulfuric acid is the sulfur containing material of choice, temperatures in the range of from about 927° C. to about 1200° C. will be employed. Because of its high temperature, stream 6 will usually be initially cooled on discharge from unit 2 before further processing by passing stream 6 through an auxiliary waste heat recovery facility such as a steam boiler 6 (a).

After combustion and cooling the hot process gases which are a mixture of sulfur dioxide, nitrogen, water, carbon dioxide and minor quantities of entrained solid materials are fed via line 7 into scrubbing tower 8. In general, tower 8 can be any conventional apparatus which allows for liquid-gas contact, as for example a fractional or a simple distillation column. As can be seen from FIG. 1, tower 8 is basically an elongated structure whose internal portions will allow for contact between sulfuric acid and the hot processes gases. These internal portions are composed of materials which are inert under the process conditions. Illustrative of such inert materials are glass, ceramics, fluorocarbons and the like. Tower 8 includes a process gas inlet 9 at the lower portion of tower 8 which is fluid communication with process gas stream 6 and heat exchange unit 6 (a) via line 7, and a gas outlet 10 at the top of tower 8 for discharge of the scrubbed gases from tower 8. Tower 8 also includes a gas-liquid contact area 11 in the intermediate portion of the tower containing means for promoting gas-liquid contact. Any conventional means for promoting such contact can be employed. For example, area 11 may contain a packing as for example fiberglass, glass rods, beads, spheres, rings or saddles, stainless steel turnings, ceramic chips or the like. Similarly, area 11 may include grids, sieve trays, bubble cap plates or other suitable apparatus for promoting such contact. Tower 8 also includes a sulfuric acid inlet 12 at the top of tower 8 above area 11 for charging sulfuric acid stream 14 into area 11, and an acid outlet 13 at the bottom of tower 8 for discharge of acid containing whatever water and solid materials which are removed from the gas.

In operation of tower 8, the process gas stream is introduced into tower 8 by way of line 7 and process gas inlet 9. In general, the temperature of the gas is from about 150° to about 400° C. In the preferred embodiments of the invention, the temperature of the gas is from about 200° to about 340° C., and in the particularly preferred embodiments is from about 260° to about 320° C. If tower 8 is operated at relatively low temperatures, i.e. less than about 150° C., the scrubbed gases discharged from tower 8 contain larger amounts of sulfuric acid mist and the particle size of the mist particles are smaller than when tower 8 is operated at higher temperatures. The smaller mist size and heavier loading complicates the mist removal step. In the preferred embodiments of the invention depicted in FIG. 1, the process gas percolates upward through the area 11 coming into countercurrent contact with concentrated sulfuric acid which has been sprayed or otherwise dispersed or introduced into tower 8 by way of line 14 and acid inlet 12. In the preferred embodiments of the invention, the concentrated sulfuric acid has a sulfuric acid content of at least about 85 weight percent based on the total weight of the acid, and in the particularly preferred embodiments, the sulfuric acid content is at least about 90 weight percent on the same basis. Amongst these particularly preferred embodiments, most preferred are those embodiments in which the weight percent on sulfuric acid is at least about 95. It should be noted that while countercurrent contact is preferred because of increased efficiency other modes of contacting the gas and sulfuric acid can be employed. As the upward flowing gases and downward flowing acid contact, the acid absorbs water vapor in the gas and removes some of the entrained solid materials. The acid also removes some of the heat from the gas. The warmed, diluted sulfuric acid containing entrained solid materials and water collects at the bottom of tower 8 and is removed from the bottom of tower 8 by way of acid outlet 13 and stream 15. Make-up concentrated sulfuric acid from sulfuric acid reservoir 16 is added to stream 15 by way of line 17 to compensate for the diluted strength of stream 15 due to water absorption in tower 8. When needed additional make-up acid can be fed to reservoir 16 via line 16 (a). The resulting combined sulfuric acid stream 18 is of increased sulfuric acid concentration compared to stream 15, and is suitable for further gas scrubbing in tower 8, after cooling to compensate for heat generation due to acid dilution. Stream 18 is passed through cooling coils 19, which are cooled by cooling water stream 20 or other suitable cooling medium which is sprayed or circulated external to coils 19. The cooling of the acid in coils 19 may also be accomplished by the circulation of ambient air external to coils 19, in which case the coils 19 will preferably be provided with external fins. Alternatively, the acid stream 18 may be cooled by Rankin cycle heat recovery unit. After cooling, the sulfuric acid is recycled by way of line 14 and pump 21 and the process is repeated, or can be withdrawn from the system by way of line 21(a). Coils 19 and pump 21 can be interchanged in the flow stream.

The cooled, dried and scrubbed gases are discharged from the upper portion of tower 8 by way of gas outlet 10. The gas may contain an entrained sulfuric acid mist which must be removed before further processing. This mist is highly objectional in some processes because it causes corrosion of process equipment, and in addition, if discharged to the atmosphere, the mist results in a serious air pollution problem. For mist removal, the gas is conveyed to mist eliminator 25 by way of line 22. Eliminator 25 contains filter pad or mesh 23. As the gas stream flows upward through unit 25, the liquid mist droplets impinged on pad 23 with the resultant removal of entrained droplets of sulfuric acid from the gas stream. Collected acid is removed from the bottom of eliminator 25 by way of stream 24 and conveyed to reservoir 16 for use in the operation of scrubbing tower 8. Alternatively, the gas stream may be passed through an electrostatic precipitator to remove entrained acid droplets and mist, or some type of agglomeration means to increase the size of the mist and solid particles and removal of same with a Venturi scrubber or equivalent equipment.

The gas stream exiting the tower 8 may include solid sub-micron material which is not removed by the scrubbing operation. This material can foul the elements of the mist removing device interferring with the efficiency of the mist removal step. Accordingly, in the preferred embodiments of the invention some means for removing this adhered material, as for example an irrigation system is employed.

The process gas discharged from outlet 25 of mist eliminator 21 can be conveyed via line 26 to some unit for catalytic oxidation of the sulfur dioxide into sulfur trioxide by conventional procedures, and further conversion of the sulfur trioxide into sulfuric acid or any other process requiring such an $SO_2$ gas stream. Illustrative of such procedures are those described in detail in U.S. Pat. Nos. 3,432,263; 3,475,120; 4,213,958; 4,088,742 and references cited therein.

What is claimed is:

1. A process for removing solid materials and water from a process stream comprising sulfur dioxide, water and entrained solid materials prior to the catalytic conversion of the sulfur dioxide to sulfur trioxide, said process stream being produced by the combustion of one or more sulfur containing materials, said process consisting essentially of the steps of:

scrubbing said process gas stream to remove entrained solids with a sulfuric acid composition containing at least about 85 weight percent sulfuric acid based on the total weight of the composition; and feeding said scrubbed stream into a sulfuric acid mist eliminating means.

2. A process according to claim 1 wherein said composition contains at least about 90 weight percent sulfuric acid.

3. A process according to claim 2 wherein said composition contains at least about 95 weight percent sulfuric acid.

4. A process according to claim 3 wherein said composition contains at least about 98 weight percent sulfuric acid.

5. A process according to claim 1 wherein said scrubbing comprises contacting said process gas stream of said sulfuric acid composition in counter current fashion.

6. A process according to claim 5 wherein said contacting is carried out in a distillation tower having means for promoting gas-liquid contact.

7. A process according to claim 6 wherein said contacting comprises:

introducing said process gas stream into the lower portion of said tower at a point below said means for promoting gas-liquid contact;

introducing said sulfuric acid composition into the upper portion of said tower at a point above said means for promoting gas-liquid contact; and contacting said stream and said composition in counter-current fashion as said process gas stream flows upward through said means and said composition flows downward through said means.

8. A process according to claim 1 wherein said mist eliminating means includes one or more mist eliminating elements and materials removal means for removing submicron solid materials adhering to said elements.

9. A process according to claim 8 wherein said materials removal means comprises means for irrigating said elements with water or sulfuric acid.

* * * * *